United States Patent
Brandl

(10) Patent No.: US 7,392,588 B2
(45) Date of Patent: Jul. 1, 2008

(54) ROTARY ENCODER

(75) Inventor: Alois Brandl, Siegsdorf (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 11/944,189

(22) Filed: Nov. 21, 2007

(65) Prior Publication Data

US 2008/0120851 A1 May 29, 2008

(30) Foreign Application Priority Data

Nov. 28, 2006 (DE) .................. 10 2006 056 461

(51) Int. Cl.
  *G01B 21/00* (2006.01)
  *G01D 21/00* (2006.01)
(52) U.S. Cl. .................. 33/1 PT; 33/1 N; 33/706
(58) Field of Classification Search .......... 33/1 PT, 33/1 N, 706, 707, 708
See application file for complete search history.

(56) References Cited

U.S. PATENT DOCUMENTS

| 6,111,402 A | 8/2000 | Fischer | |
| 6,922,899 B2 * | 8/2005 | Nakamura et al. | 33/1 PT |
| 6,946,649 B2 * | 9/2005 | Uenaka et al. | 33/1 PT |
| 6,973,731 B2 * | 12/2005 | Aikawa et al. | 33/1 PT |
| 7,034,282 B2 * | 4/2006 | Oka et al. | 33/1 PT |
| 7,346,993 B2 * | 3/2008 | McMurtry et al. | 33/1 PT |
| 2003/0093907 A1 * | 5/2003 | Schroter et al. | 33/1 PT |
| 2005/0000580 A1 | 1/2005 | Tranovich, et al. | |

FOREIGN PATENT DOCUMENTS

DE    92 18 383    2/1994
DE    197 51 853   6/1998

OTHER PUBLICATIONS

Search Report, European Patent Application No. EP 07 01 9987, dated Mar. 6, 2008 (translated).

* cited by examiner

*Primary Examiner*—Yaritza Guadalupe-McCall
(74) *Attorney, Agent, or Firm*—Kenyon & Kenyon LLP

(57) ABSTRACT

A rotary encoder includes two component groups that are rotatably arranged relative to each other about an axis. The second component group includes a shaft having a central bore hole, a shoulder and a ridge having an outer surface, and a ring element having an inner surface and an actuation device. In addition, the rotary encoder has a component, which is arranged between the outer surface and the inner surface of the ring element. Both points on the inner surface of the ring element as well as points on the outer surface of the shaft have different distances with respect to the axis such that, via the actuation device, the ring element rests on the shoulder so that a radial force acts on the ridge via the component and a machine part is clampable.

10 Claims, 4 Drawing Sheets

ROTARY ENCODER

CROSS-REFERENCE TO RELATED APPLICATIONS

The present application claims priority to Application No. 10 2006 056 461.8, filed in the Federal Republic of Germany on Nov. 28, 2006, which is expressly incorporated herein in its entirety by reference thereto.

FIELD OF THE INVENTION

The present invention relates to a rotary encoder, e.g., for determining relative angular positions.

BACKGROUND INFORMATION

Rotary encoders are frequently used to determine the angular position of two machine parts, which are rotatable relative to each other, and operate according to an inductive measuring principle, for example. In inductive rotary encoders, exciter coils and receiver coils are applied, for example, in the form of circuit traces, on a shared circuit board, which is permanently joined to a stator of the rotary encoder, for example. Arranged across from this circuit board at a defined axial distance and centered is another board, which takes the form of a code disk, on which alternating electrically conductive and nonconductive surfaces are mounted at periodic intervals as a scale-division region or scale-division structure, and which is joined to the rotor of the rotary encoder in a rotatably fixed manner. If an electric exciter field, which is alternating over time, is applied to the exciter coils, signals are generated in the receiver coils as a function of the angular position during the relative rotation between rotor and stator. These signals are processed further in an evaluation electronics.

Such rotary encoders are frequently used as measuring devices for electrical drives to determine the absolute angular position of respective drive shafts.

A clamping coupling described in German Published Utility Model No. 92 18 383, in which an actuating screw presses directly onto a ring such that clamping forces are producible via conical surfaces. Such a conventional system has the disadvantage that the clamping forces are comparatively small due to the geometric relationships prevailing within the system.

SUMMARY

Example embodiments of the present invention provide a rotary encoder in which an increase in the clamping forces between a shaft to be measured and the rotary encoder shaft is achievable in a simple manner.

According to example embodiments of the present invention, a rotary encoder includes a first component group and a second component group, the component groups being arranged rotatable relative to each other about an axis. The first component group has a detector system. The second component group includes a code disk and a shaft having a central bore hole, a shoulder, and a ridge having an outer surface. Furthermore, the second component group includes a ring element having an inner surface and an actuation device, and a component that is arranged between the outer surface and the inner surface of the ring element. The detector system is able to scan the code disk for determining the relative angular position of the two component groups with respect to each other. Both points on the inner surface of the ring element as well as points on the outer surface of the shaft have different distances with respect to the axis such that, via the actuation device, the ring element rests on the shoulder so that a force having a radial directional component acts on the ridge via the component such that it is possible to clamp a machine part inserted into the bore hole of the shaft. For example, the machine part inserted into the bore hole of the shaft may be a shaft of a motor, e.g., the angular position of which is to be measured.

The rotary encoder may be geometrically arranged such that, via the actuation device, the ring element rests on the shoulder so that a reaction force in a y-direction, which has a directional component parallel to the axis, is applied on the ring element. For this purpose, the component has a planar cross-section, a first point in the plane of the cross-section being definable on the outer surface of the shaft. Starting from the cross-section, or from the plane of the cross-section, additionally, counter to the y-direction, a first point is definable on the inner surface of the ring element. Furthermore, starting from the cross-section in the y-direction, a second point is definable on the inner surface of the ring element and a second point is definable on the outer surface of the shaft. The distance of the first point on the inner surface with respect to the axis is smaller than the distance of the second point on the inner surface with respect to the axis. Furthermore, the distance with respect to the axis of the first point on the outer surface is smaller than the distance of the second point on the outer surface.

The inner surface of the ring element may be conically shaped, and/or the outer surface of the shaft may be conically shaped.

Due to the configuration, rotary encoders having such a construction are able to apply comparatively high clamping forces on the machine part to be clamped since, on the one hand, the contact point of the force acting radially toward the axis is set far apart axially from the base or root of the ridge and, on the other hand, the ridge may be shaped so as to be very thin-walled at its base. Accordingly, the lever ratios thus achieved apply high bending moments via the component, while the ridge in the radial direction has a comparatively small resistance moment or a great flexural softness. The flexural softness of the ridge in the radial direction may be increased by at least one slot whose orientation has an axial directional component.

The component, which is arranged between the outer surface of the shaft and the inner surface of the ring element, may be arranged as a spring ring.

The shaft may have a, e.g., circumferential, groove for supporting and fixing the component.

The actuation device may be arranged as a screw or a set screw in operative connection with a thread or a threaded bore hole on the ring element.

The rotary encoder may be configured to operate according to an inductive measuring principle and may have, e.g., a circuit board having exciter and receiver circuit traces as a detector system. Furthermore, the code disk may have electrically conductive and non-conductive scale-division regions arranged in alternation.

Further details and aspects of a rotary encoder according to example embodiments of the present invention are described in more detail below with reference to the appended Figures.

DETAILED DESCRIPTION

Figure 1:
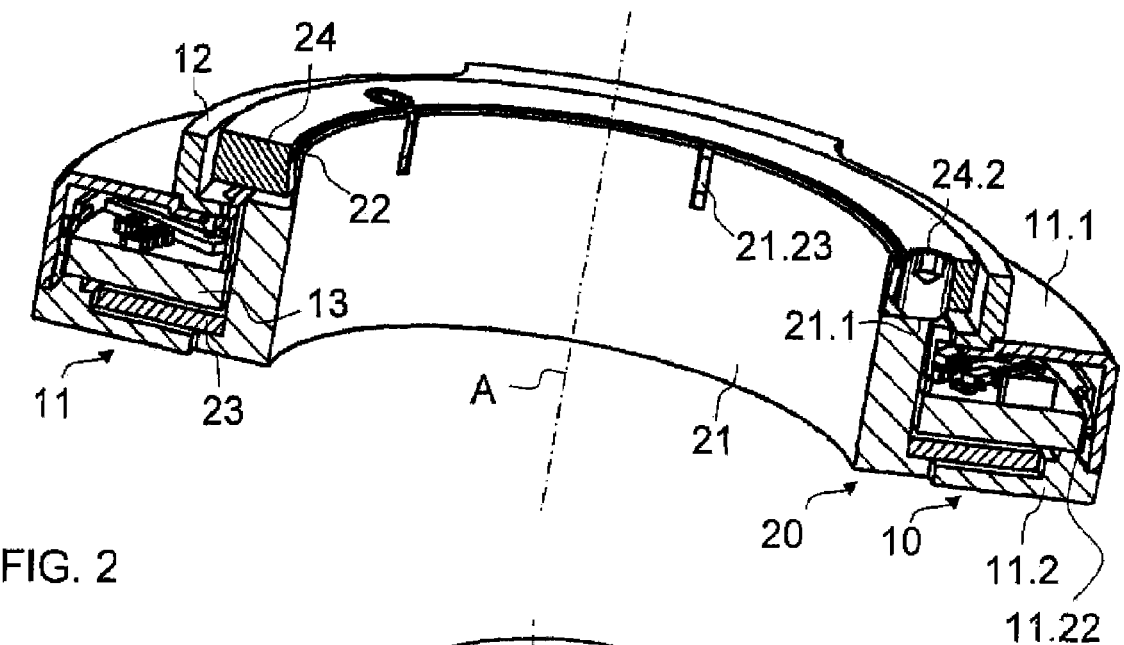
FIG. 1 is a perspective cross-sectional view through a rotary encoder according to an exemplary embodiment of the present invention.
Figure 2:
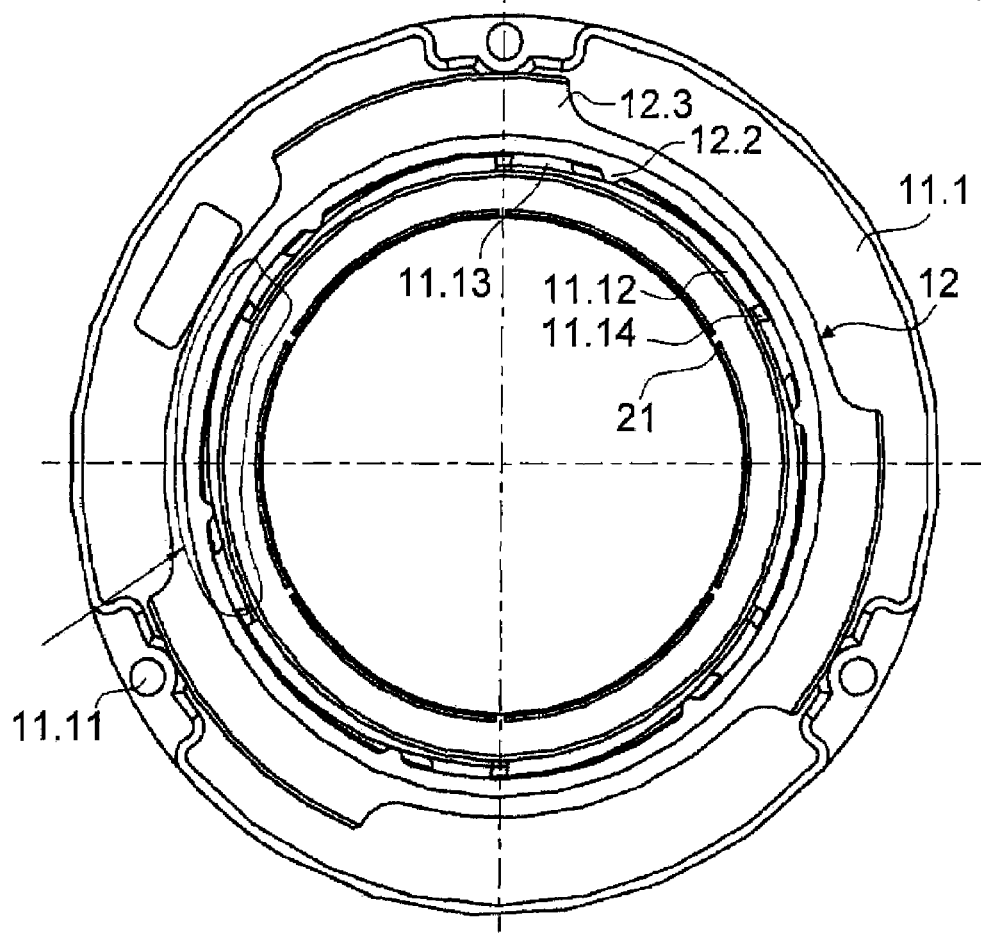
FIG. 2 is a top view of the rotary encoder without a ring element.

FIG. 1 is a sectional view through a rotary encoder according to an exemplary embodiment of the present invention. The rotary encoder includes a first component group, e.g., arranged as a stator 10, and a second component group, e.g., arranged as a rotor 20. In a measuring operation, rotor 20 and stator 10 are arranged rotatable relative to each other about an axis A.

Figure 5A:
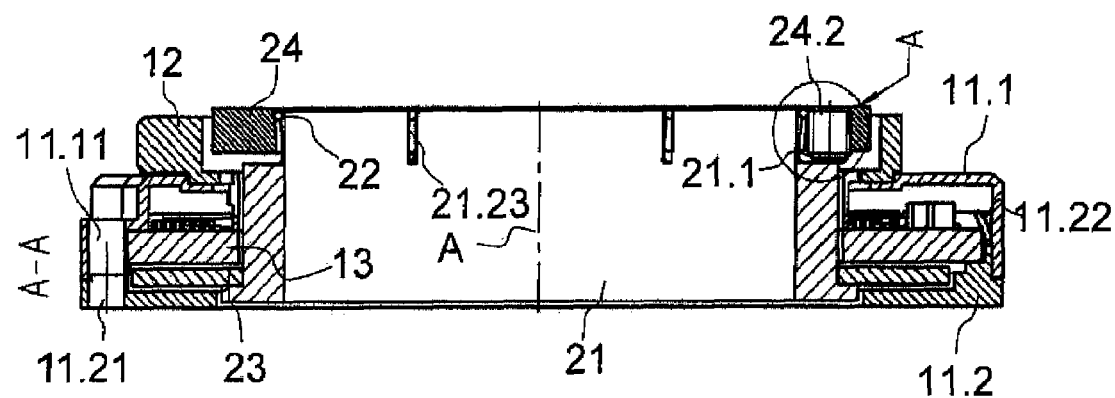
FIG. 5a is a cross-sectional view through the rotary encoder.
Figure 5B:
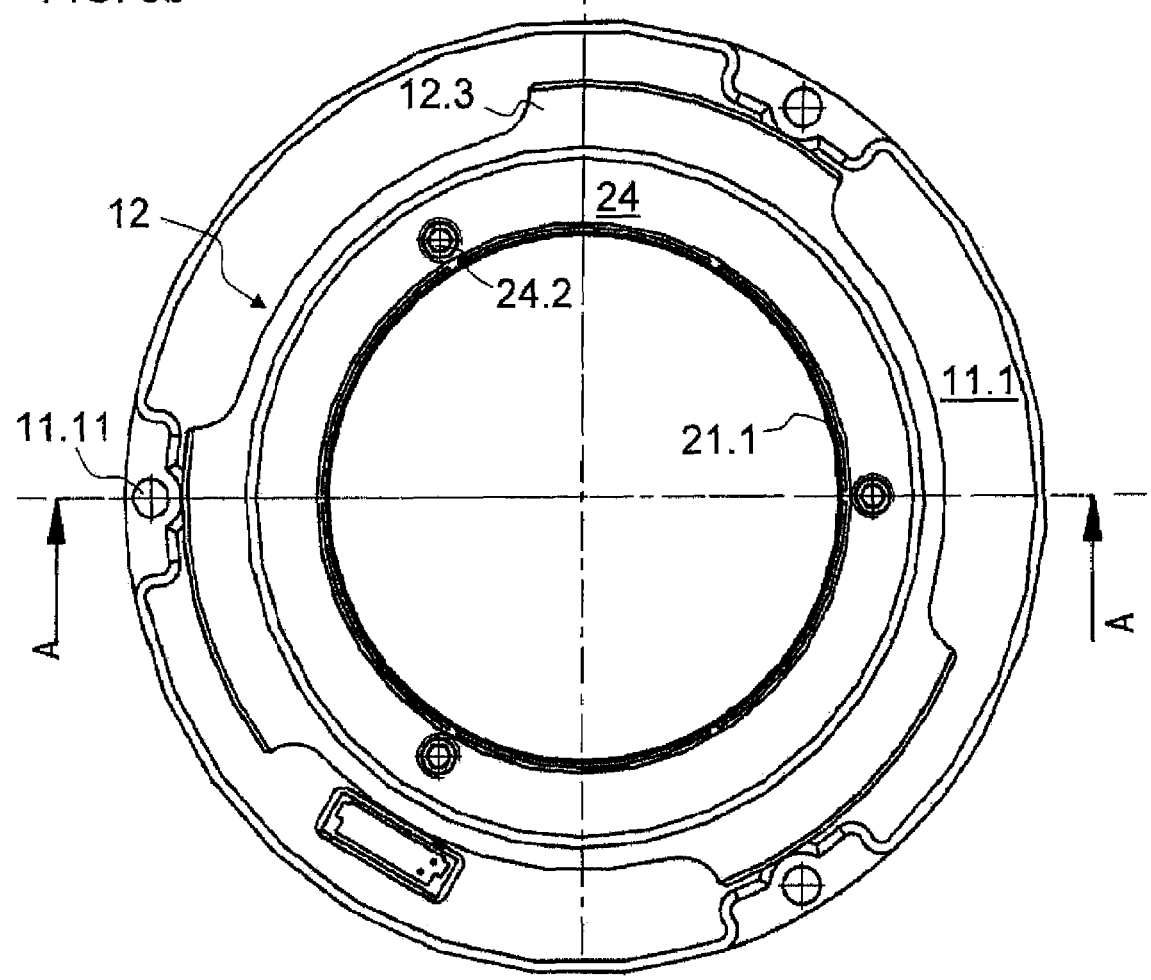
FIG. 5b is a top view of the rotary encoder including the ring element.

Stator 10 includes a two-part housing 11, which, as illustrated in FIG. 1, includes an upper first housing part 11.1 and a lower second housing part 11.2. Stator 10 may be fixed to a housing of a motor, for example, with the aid of bore holes 11.11, 11.21 (see, e.g., FIG. 5a). In the illustrated exemplary embodiment, the rotary encoder operates according to an inductive measuring principle. Accordingly, a detector system is provided on stator 10 in the form of a circuit board 13 and is joined by a flange 11.22 in a rotatably fixed manner to second housing part 11.2.

German Published Patent Application No. 197 51 853, for example, explains the functional principle of an inductively operating rotary encoder and is expressly incorporated herein in its entirety by reference thereto. On a circuit board 13, as receiver coils, receiver circuit traces are arranged in an inner receiver track, and additional receiver circuit traces are arranged in an outer receiver track. In addition, exciter circuit traces are provided as exciter coils on circuit board 13, which are applied on an inner, a central and an outer exciter track. Circuit board 13 itself has a central bore hole and is multilayered.

In the resented exemplary embodiment illustrated, rotor 20 includes a shaft that takes the form of hollow shaft 21. A motor shaft, for example, may be inserted and fixed in the central bore hole of hollow shaft 21 in order for the rotary encoder to ascertain the relative angular position of the motor shaft with respect to the housing of the motor. Hollow shaft 21 is a rotationally symmetric body and includes a shoulder 21.1 and a comparatively thin-walled ridge 21.2. Ridge 21.2 has a groove 21.21, an outer surface 21.22 that is conical in the radial direction, and slots 21.23.

Furthermore, an annular code disk 23 is secured in a rotatably fixed manner on rotor 20, e.g., on its hollow shaft 21. Code disk 23 includes a substrate, which in the illustrated exemplary embodiment is made of epoxide resin and is arranged on the two scale-division tracks. The scale-division tracks have an annular shape and with respect to axis A are provided concentrically on the substrate at different diameters. Each of the two scale-division tracks includes a periodic sequence of alternating electrically conductive scale-division regions and non-conductive scale-division regions. As a material for the electrically conductive scale-division regions, copper is applied onto the substrate in the example illustrated. In the non-conductive scale-division regions, by contrast, the substrate is not coated. In the example embodiment illustrated, the inner scale-division track includes a first semi-annular scale-division region having an electrically conductive material, e.g., copper, as well as a second semi-annular scale-division region in which no conductive material is provided. Radially adjacent to the first scale-division track, there is the second scale-division track on the substrate, the second scale-division track also including a plurality of electrically conductive scale-division regions and non-conductive scale-division regions located in between. In this instance, the various scale-division regions are configured in terms of material in the same manner as the scale-division regions of the first scale-division track. The second scale-division track may include thirty-two periodically arranged, electrically conductive scale-division regions and accordingly thirty-two non-conductive scale-division regions arranged in between.

Code disk 23 and circuit board 13 are located across from each other at an axial distance such that axis A passes through the center points of code disk 23 and circuit board 13 and that, in the event of a relative rotation between code disk 23 and circuit board 13, a signal is able to be generated in circuit board 13 by induction effects as a function of the respective angular position. According to this measuring principle, circuit board 13 is able to scan code disk 23 in a measuring operation in order to determine the relative angular position of rotor 20 and stator 10 with respect to each other. The precondition for forming corresponding signals is that the exciter circuit traces generate an electromagnetic exciter field that alternates over time in the region of the scanning tracks or in the region of the scale-division tracks scanned thereby. In the exemplary embodiment illustrated, the exciter circuit traces take the form of multiple planar-parallel, current-carrying, individual circuit traces. If the exciter circuit traces of a circuit trace unit all carry a current in the same direction, then a tubular or cylindrically directed electromagnetic field is formed around the respective circuit trace unit. The field lines of the resulting electromagnetic field extend in the form of concentric circles around the circuit trace units, the direction of the field lines depending in a conventional manner on the direction of the current in the circuit trace units.

Before the measuring operation can be initiated, however, the axial distance between code disk 23 and circuit board 13 must be adjusted as precisely as possible. The rotary encoder has no bearing of its own, that is, it is arranged without a bearing, such that, prior to mounting on the motor shaft and on the housing of the motor, code disk 23 and circuit board 13 are displaceable with respect to each other axially and to a small extent also radially. On the other hand, e.g., in connection with the inductive measuring principle, a correct axial distance and proper centering are decisive for the size of the signal amplitudes and thus for the quality of the measuring result. For this reason, in the exemplary embodiment illustrated, an optimal adjustment of the axial distance and the relative centricity between code disk 23 and circuit board 13 is performed in the factory of the manufacturer of the rotary encoder, and afterwards code disk 23 and circuit board 13 are locked relative to each other such that this adjustment is not lost or disturbed during the transport to the operator of the rotary encoder. In the course of mounting the rotary encoder, the lock is released in a final step, an optimized axial distance and an optimized centering being provided in the measuring operation.

For the purpose of locking, the rotary encoder includes a clamping ring 12 made of plastic having a guiding surface 12.1, cams 12.2, radial projections 12.3 and clip catches 12.4. First housing part 11.1 furthermore has curved wedge-shaped elements 11.12, which are connected to the main body of first part 11.1 via a crosspiece 11.13. Viewed in the radial direction, curved wedge-shaped elements 11.12 have convex surfaces on the outside and concave surfaces on the inside. Due to slots 11.14, curved wedge-shaped elements 11.12 are set apart from each other in the circumferential direction and are radially movable with respect to one another. With all its components, e.g., wedge-shaped elements 11.12, first housing part 11.1 is manufactured from plastic in one piece as an injection-molded part.

Figure 3:
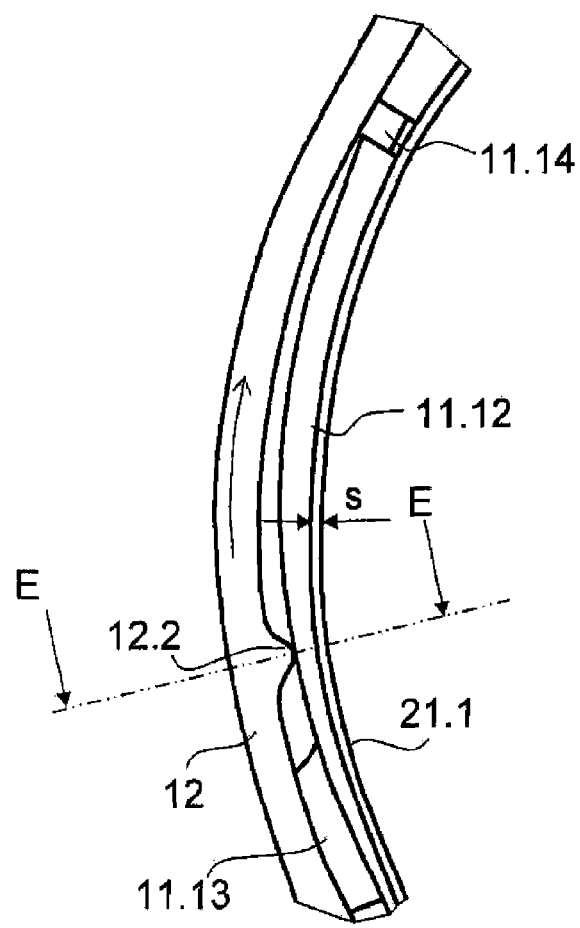
FIG. 3 is a detailed view of a transport securing system.
Figure 4:
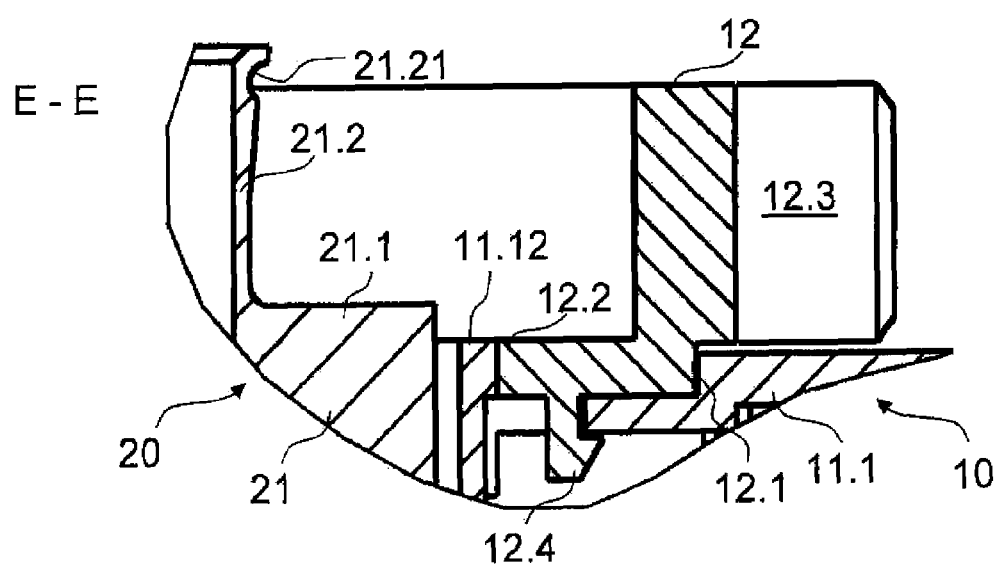
FIG. 4 is a partial cross-sectional view of a region of the transport securing system.

As illustrated in FIG. 4, at the factory prior to an adjustment, clamping ring 12 is first joined to first housing part 11.1 in detachable fashion using a clip connection, e.g., in a position in which cams 12.2 touch wedge-shaped elements 11.12 in their radially narrow regions (see, e.g., FIG. 3). Accordingly, an air gap s exists between hollow shaft 21 and wedge-shaped elements 11.12 such that, relative to stator 10, rotor 20 is rotatable and within certain limits axially displaceable. Next, hollow shaft 21 is displaced axially relative to housing 11 until a testing device connected to the rotary encoder signals an optimum signal quality. Accordingly, the axial distance between code disk 23 and circuit board 13 is optimally adjusted.

In this state, clamping ring 12 is twisted, as illustrated in FIG. 3, clockwise relative to first housing part 11.1, it being possible to act upon radial projections 12.3 for better control. This twisting motion has the effect that cams 12.2 press wedge-shaped elements 11.12 radially inward since the latter are radially flexible. Corresponding slots 11.14 are provided to increase the elasticity of wedge-shaped elements 11.12. In this manner, air gap s is reduced to zero and wedge-shaped elements 11.12 clamp stator 10 on rotor 20 to prevent a relative axial displacement. At the same time, the all-round symmetric application of force on hollow shaft 21 automatically results in centering code disk 23 relative to circuit board 13.

In this connection, one should consider that the region of hollow shaft 21, on which the concave regions of wedge-shaped elements 11.12 act, represents a cylindrical lateral surface, which has no projection in that region. Accordingly, the clamping is provided merely by friction locking. To increase the retention forces of the clamping, one or both surfaces, for example the cylindrical lateral surface and/or the concave regions of wedge-shaped elements 11.12, may be roughened. For example, a knurl or other roughened surface structure may be provided for this purpose.

Thus, the adjustment may be performed with stepless refinement. In this state, rotor 20 not rotatable relative to stator 10. The rotary encoder accordingly may be transported safely without the axial distance that was fixed in the factory becoming maladjusted.

In the course of mounting the rotary encoder on a motor, first the motor shaft is inserted into hollow shaft 21 of the rotary encoder. Next, housing 11 is fastened to the housing of the motor by inserting bolts through bore holes 11.11, 11.21 and screwing them into corresponding threaded bore holes in the housing of the motor.

Next, hollow shaft 21 is fastened to the motor shaft. For this purpose, a ring element 24 having a conical inner surface 24.3 and a spring ring 22 are provided on the rotary encoder, spring ring 22 being arranged between outer surface 21.22 of ridge 21.2 and inner surface 24.3 of ring element 24, and engaging, e.g., in groove 21.21. A geometric area may be centrally defined by spring ring 22, which is orthogonally penetrated by axis A. This plane is denoted as cross-section Q.

Figure 6:
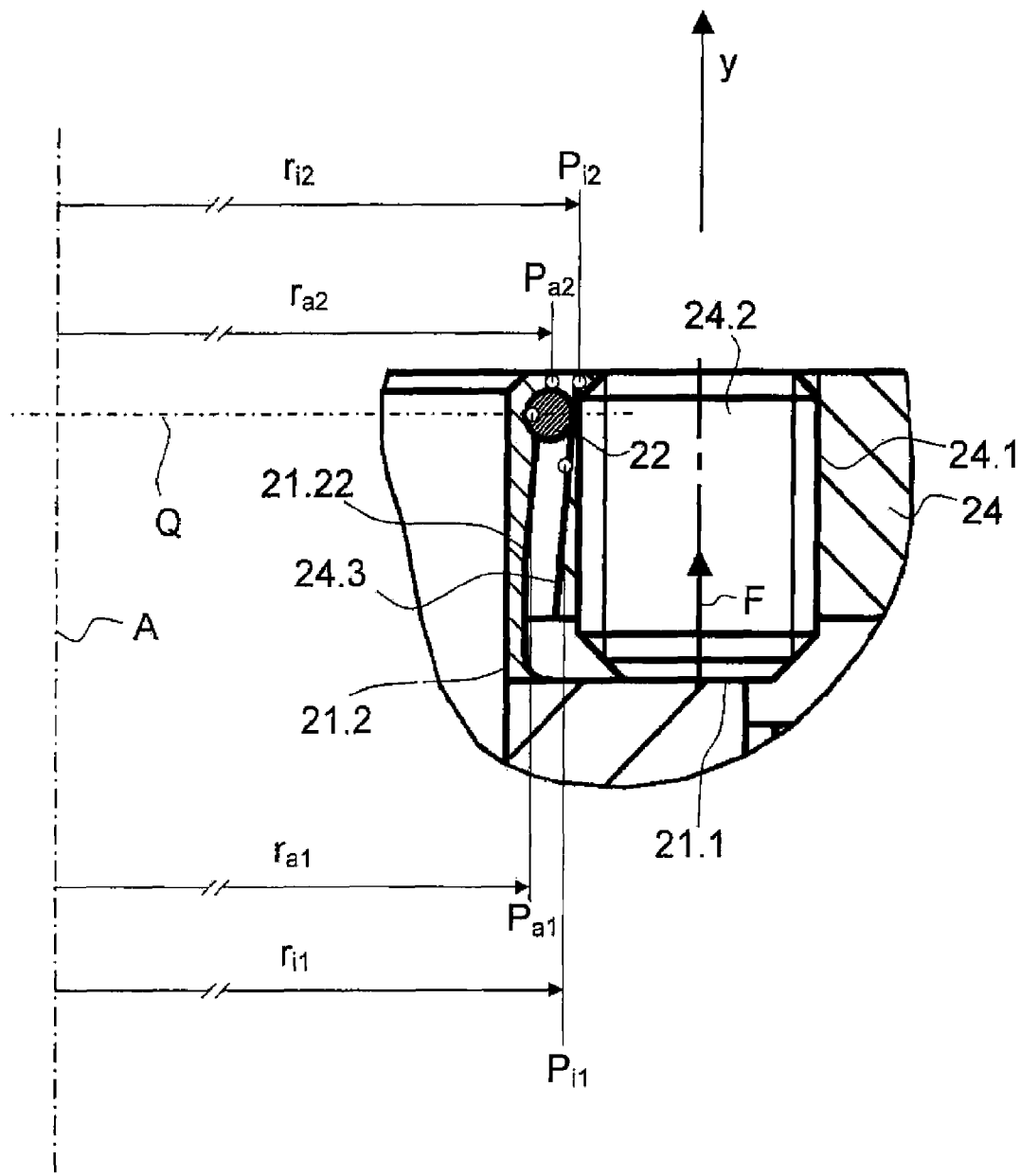
FIG. 6 is a partial cross-sectional view of the rotary encoder.

As illustrated in FIG. 6, constructively, a geometric system is created in which both points $P_{i1}$, $P_{i2}$ on inner surface 24.3 of ring element 24 as well as points $P_{a1}$, $P_{a2}$ on outer surface 21.22 of hollow shaft 21 or of ridge 21.2 are definable, which have different distances $r_{i1}$, $r_{i2}$; $r_{a1}$, $r_{a2}$ with respect to axis A. As mentioned above, a plane cross-section Q may extend through spring ring 22, first point $P_{a1}$ being located or being definable in the plane of cross-section Q on outer surface 21.22 of shaft 21.

Starting from cross section Q of spring ring 22 in a direction counter to the y-direction (-y, that is, downward in FIG. 6) a virtual geometric first point $P_{i1}$ is definable on inner surface 24.3 of ring element 24. In the y-direction (upward in FIG. 6), on the other hand, a second point $P_{i2}$ is definable or located on inner surface 24.3 and second point $P_{a2}$ is definable or located on outer surface 21.22. Radial distance $r_{i1}$ of first point $P_{i1}$ on inner surface 24.3 with respect to axis A is smaller than distance $r_{i2}$ of second point $P_{i2}$ on inner surface 24.3 with respect to axis A. Moreover, distance $r_{a1}$ of first point $P_{a1}$ on outer surface 21.22 with respect to axis A is also smaller than distance $r_{a2}$ of second point $P_{a2}$ on outer surface 21.22 with respect to axis A.

In the course of installation, set screws 24.2 are screwed into threaded bore holes 24.1 of ring element 24 such that ring element 24 rests by set screws 24.2 on shoulder 21.1. A reaction force F is thereby applied on ring element 24 in a direction y, which is oriented parallel to axis A. Ring element 24 moves in the y-direction and presses onto spring ring 22 in groove 21.21. In the process, a force acts radially in the direction of the interior and ridge 21.2 is pressed radially toward the interior such that the motor shaft inserted into hollow shaft 21 is clamped in a rotatably fixed manner. This clamping also fixes hollow shaft 21 axially on the motor shaft. Due to the configuration, very high clamping forces are achieved in the process because, on the one hand, groove 21.21 is set far apart from shoulder 21.1, that is, from the base or the toot of ridge 21.2, and, on the other hand, due to the conical arrangement of ridge 21.2, the latter is configured to be very thin-walled on the base. Accordingly, high bending moments are applied via spring ring 22, while ridge 21.2 has a comparatively small resistance moment. The resistance moment of ridge 21.2 is additionally reduced by slots 21.23, which are oriented staggered in the circumferential direction parallel to axis A.

After stator 10 is fixed on the housing of the motor and rotor 20 is fixed on the motor shaft, the lock that is set to maintain the factory-adjusted axial distance between code disk 23 and circuit board 13 may be released. This is done by turning clamping ring 12 counterclockwise relative to housing 11. Thus, cams 12.2 are brought into the tapered regions of wedge-shaped elements 11.12, and the clamping between first housing part 11.1 and hollow shaft 21 is released. Air gap s is in this position greater than zero, and the measuring operation may be initiated.

What is claimed is:

1. A rotary encoder, comprising:
   a first component group including a detector system; and
   a second component group including:
      a code disk;
      a shaft having a central bore hole, a shoulder and a ridge having an outer surface;
      a ring element having an inner surface and an actuation device; and
      a component arranged between the outer surface and the inner surface of the ring element;
   wherein the first component group and the second component group are rotatable relative to each other about an axis;
   wherein the detector system is configured to scan the code disk to determine a relative angular position between the two component groups with respect to each other;

wherein points on the inner surface of the ring element and points on the outer surface of the shaft having different distances with respect to the axis such that, via the actuation device, the ring element rests on the shoulder, a force having a radial directional component acts on the ridge via the component, and a machine part inserted into the bore hole of the shaft is clampable.

2. The rotary encoder according to claim 1, wherein the ring element rests on the shoulder via the actuation device such that a reaction force in a direction, which has a directional component parallel to the axis, is applied on the ring element, the component having a cross-section, a first point definable in a plane of the cross-section on the outer surface of the shaft, and starting from the cross-section:
- a first point counter to the direction is definable on the inner surface of the ring element;
- a second point in the direction is definable on the inner surface of the ring element and a second point is definable on the outer surface of the shaft;
- a distance of the first point on the inner surface of the ring element with respect to the axis is smaller than a distance of the second point on the inner surface of the ring element with respect to the axis; and
- a distance of the first point on the outer surface of the shaft with respect to the axis is smaller than a distance of the second point on the outer surface of the shaft with respect to the axis.

3. The rotary encoder according to claim 1, wherein the component is arranged as a spring ring.

4. The rotary encoder according to claim 1, wherein the shaft includes a groove configured to support the component.

5. The rotary encoder according to claim 1, wherein the outer surface of the shaft is conically shaped.

6. The rotary encoder according to claim 1, wherein the inner surface of the ring element is conically shaped.

7. The rotary encoder according to claim 1, wherein the rotary encoder is configured to operate according to an inductive measuring principle.

8. The rotary encoder according to claim 7, wherein the detector system includes a circuit board having exciter and receiver circuit traces.

9. The rotary encoder according to claim 7, wherein the code disk includes alternating electrically conductive and non-conductive scale-division regions.

10. The rotary encoder according to claim 1, wherein the shaft is adapted to attach to a motor shaft, the rotary encoder configured to determine an angular position of the motor shaft with respect to a motor housing.

* * * * *